United States Patent [19]

Dick et al.

[11] 4,193,529
[45] Mar. 18, 1980

[54] METHOD FOR INTERCONNECTING DISSIMILAR METALS WELDING TO AN EXPLOSIVELY BONDED BIMETALLIC COUPLING

[75] Inventors: Charles B. Dick, Port Orchard, Wash.; Curtis L. Knutson, Tulsa, Okla.; Frederick W. Jones, Upper Marlboro; Richard D. Ireland, Chevy Chase, both of Md.

[73] Assignee: The United States of America as represented by the Secretary of the Navy, Washington, D.C.

[21] Appl. No.: 885,422

[22] Filed: Mar. 13, 1978

Related U.S. Application Data

[62] Division of Ser. No. 761,917, Jan. 24, 1977, Pat. No. 4,099,661.

[51] Int. Cl.$^2$ ............................................. B23K 28/02
[52] U.S. Cl. ...................................... 228/107; 228/175
[58] Field of Search ................. 228/107, 108, 109, 175

[56] References Cited

U.S. PATENT DOCUMENTS

| | | | |
|---|---|---|---|
| 3,377,694 | 4/1968 | Simons et al. ........................ | 228/108 |
| 3,583,062 | 6/1971 | Sharp, Jr. et al. .................... | 228/108 |
| 3,744,119 | 7/1973 | Hanson et al. ........................ | 228/109 |
| 4,010,965 | 3/1977 | Izuma et al. ......................... | 228/107 X |

*Primary Examiner*—Francis S. Husar
*Assistant Examiner*—K. J. Ramsey
*Attorney, Agent, or Firm*—R. S. Sciascia; Charles D. B. Curry

[57] ABSTRACT

An apparatus and method for connecting bimetallic members by explosive bonding. The apparatus comprises a bimetallic collar having an outer aluminum ring and an inner steel ring that are connected by explosive bonding. The steel fitting is welded to the steel ring and the aluminum ring is welded to the aluminum deck. The method of making the bimetallic collar is by vertically and concentrically mounting an inner solid steel cylinder, an intermediate hollow aluminum cylinder, and an outer cardboard cylinder and thereby forming an annular acceleration cavity between the steel and aluminum cylinders and an annular powder cavity between the aluminum and cardboard cylinders. The annular powder cavity is filled with powder and ignited. The explosion causes the aluminum of the aluminum cylinder to accelerate across the acceleration cavity and become bonded to the outer surface of the solid steel cylinder. The solid steel cylinder is then bored out leaving an aluminum cylinder explosively bonded to a hollow steel cylinder. The bonded cylinders are then sliced leaving a plurality of explosively bonded concentric aluminum and steel rings. This technique has been particularly useful for connecting steel fittings to the aluminum decks of ships.

3 Claims, 3 Drawing Figures

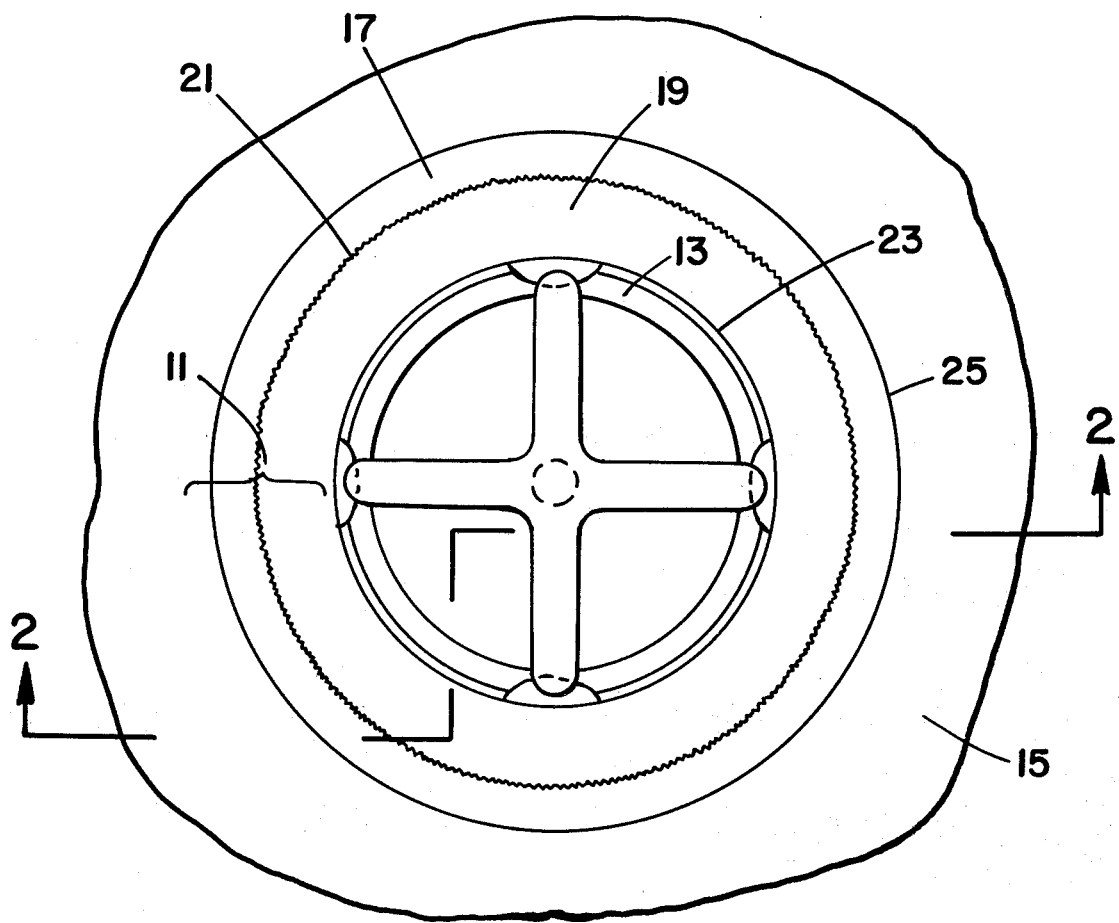
FIG_1
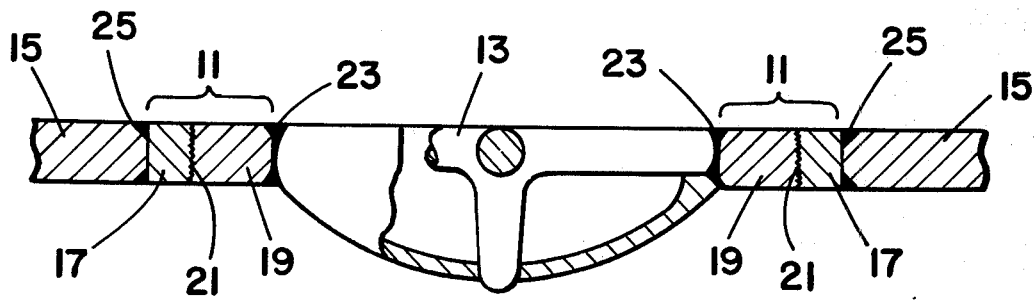
FIG_2

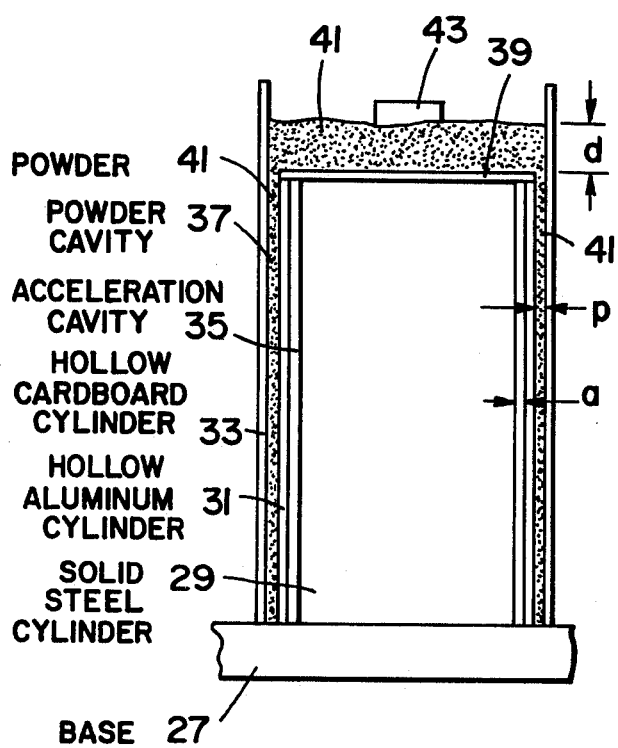
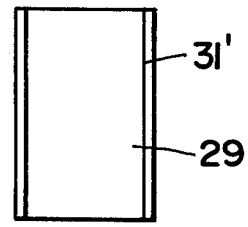
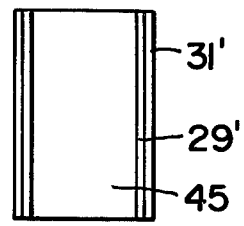
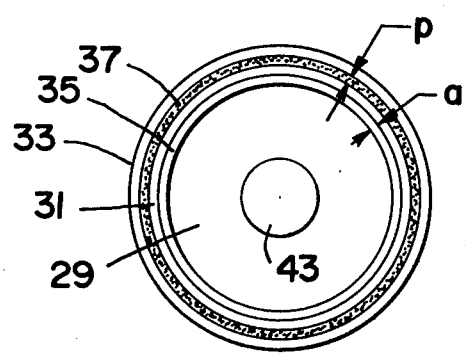
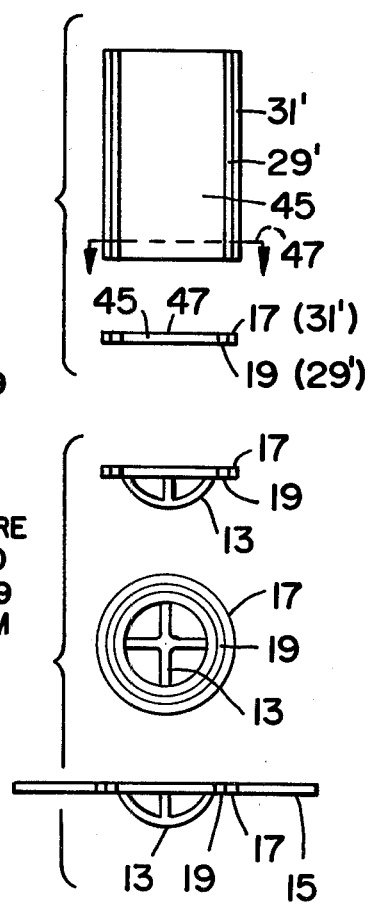
FIG_3

METHOD FOR INTERCONNECTING DISSIMILAR METALS WELDING TO AN EXPLOSIVELY BONDED BIMETALLIC COUPLING

This application is a division of patent application Ser. No. 761,917 filed Jan. 24, 1977, by Charles B. Dick et al now U.S. Pat. No. 4,099,661, issued July 11, 1978.

BACKGROUND OF THE INVENTION

1. Field of the Invention

The present invention relates to an apparatus and method for bonding dissimilar metals and more particularly to an apparatus and method for bonding steel and aluminum concentric rings by explosive bonding.

2. Description of the Prior Art

A major problem encountered in connecting steel fittings to the aluminum decks of ships is that of corrosion. The previous method used for attaching steel fittings to aluminum decks was to weld the steel fitting to a steel collar and then bolt the steel collar to the aluminum deck. This installation allowed salt water to become trapped between the steel and the aluminum allowing electrolytic action to take place which caused extensive corrosion and exfoliation of the aluminum deck. Many attempts have been made to weld steel to aluminum decks to prevent the electrolytic action caused by the salt water. However, the welding of these dissimilar metals has proved to be unsatisfactory since adequate strength has not been achieved.

This problem has been overcome by the apparatus and method of the present invention by the use of an explosive bonding technique.

SUMMARY OF THE INVENTION

Briefly, the present invention comprises an apparatus and method for connecting bimetallic members by explosive bonding. The apparatus comprises a bimetallic collar having an outer aluminum ring and an inner steel ring that are connected by explosive bonding. The steel fitting is welded to the steel ring and the aluminum ring is welded to the aluminum deck. The method of making the bimetallic collar is by vertically and concentrically mounting an inner solid steel cylinder, an intermediate hollow aluminum cylinder, and an outer cardboard cylinder and thereby forming an annular acceleration cavity between the steel and aluminum cylinders and an annular powder cavity between the aluminum and cardboard cylinders. The annular powder cavity is filled with powder and ignited. The explosion causes the aluminum of the aluminum cylinder to accelerate across the acceleration cavity and become bonded to the outer surface of the solid steel cylinder. The solid steel cylinder is then bored out leaving an aluminum cylinder explosively bonded to a hollow steel cylinder. The bonded cylinders are then sliced leaving a plurality of explosively bonded concentric aluminum and steel rings. This technique has been particularly useful for connecting steel fittings to the aluminum decks of ships.

STATEMENT OF THE OBJECTS OF THE INVENTION

An object of the present invention is to provide an apparatus for connecting dissimilar metals.

Another object of the present invention is to provide a method for connecting dissimilar metals.

Still another object of the present invention is to provide an apparatus and method for connecting a steel fitting to an aluminum structure by aluminum and steel concentric rings that are explosively bonded.

A further object of the present invention is to provide an apparatus and method for making concentric rings by an explosive bonding technique.

A still further object of the present invention is to provide a technique for connecting steel fittings to the aluminum decks of ships in a manner that prevents corrosion and exfoliation of the aluminum decks.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a plan view of the apparatus and method of the present invention for connecting a steel fitting to an aluminum deck by concentric steel and aluminum rings that are connected by explosive bonding;

FIG. 2 is a side elevation section of the apparatus and method of FIG. 1; and

FIG. 3 is a schematic diagram of the apparatus and method for making the concentric steel and aluminum rings by explosive bonding.

DESCRIPTION OF THE PREFERRED EMBODIMENT

In FIGS. 1 and 2 are illustrated the apparatus and method of the present invention for attaching a steel fitting to an aluminum member such as the deck of a ship without incurring electrolytic action and corrosion from seawater being trapped between mating steel and aluminum parts. An explosively bonded bimetallic collar 11 is used for attaching a steel fitting 13 to an aluminum deck 15. The bimetallic collar 11 consists of an outer aluminum ring 17 and an inner steel ring 19 that are connected at explosive bond line 21 and are manufactured by the explosive bonding method of the present invention as hereinafter explained in detail. In accordance with the present invention the steel fitting 13 is welded to the inner steel ring by conventional steel to steel welding at weld 23 and the outer aluminum ring 17 is welded to the aluminum deck 15 by conventional aluminum to aluminum welding at weld 25.

From this it can be seen that a unique method and apparatus is provided for connecting a steel fitting to an aluminum deck that avoids the problem of electrolytic action and prevents corrosion and exfoliation of the aluminum deck. This is made possible because the two metals of the bimetallic collar are not connected by conventional welding (which has proven to be unsuccessful) but are connected by the unique explosive bonding technique of the present invention. Therefore, all seams are made water proof by welding (two conventional welds and one explosive bond) and there is no electrolytic action and the commensurate corrosion.

In FIG. 3 is illustrated the apparatus and method for making the bimetallic collar 11 shown in the apparatus and method of FIGS. 1 and 2. The apparatus used in the initial step (step 1 of FIG. 3) includes a base plate 27 made of wood, for example. Concentrically and vertically mounted on the base plate 27 are inner solid steel cylinder 29, intermediate hollow aluminum cylinder 31, and outer hollow cylinder 33 that may be made of cardboard or the like. The outer diameter of the solid steel cylinder 29 is selected to be less than the inner diameter of the surrounding hollow aluminum cylinder 31 to form an annular acceleration cavity 35 therebetween. The inner diameter of the outer cylinder 33 is selected to be greater than the outer diameter of the hollow aluminum cylinder 31 to provide an annular powder cavity 37 formed therebetween. The upper ends of cylinders 29 and 31 are covered with a circular cover 39 which may be made of cardboard, for example. Explosive powder 41 is poured into annular powder cavity 37 and on top of circular cover 39. An ignition cap 43 is positioned on the upper surface of explosive powder 41.

An example of the specification of materials used on the apparatus and method of the present invention is as follows:

Base 27
 material—wood
 thickness—1 inch
Cylinder 29
 material—steel (ASTM-A36)
 diameter—7¾ inches
 length—16 inches
Cylinder 31
 material—aluminum (1100 Al O or F temper)
 outside diameter—9 inches
 inside diameter—8 inches
 length—16 inches
Cylinder 33
 material—cardboard
 inside diameter—10 inches
 outside diameter—10½ inches
 length—18 inches
Acceleration cavity 35
 gap "a"—⅛ inch
Powder cavity 37
 gap "p"—½ inch
 depth "d"—½ inch
Circular Cover 39
 material—cardboard
 diameter—9 inches
 thickness—⅛ inch
Powder 41
 material—explosive powder
Ignition cap
 type—electrical blasting cap
Opening 45
 diameter—5⅝ inches
Cut 47
 thickness—¾ inch Referring to the apparatus shown in step 1 of FIG. 3, circular cover 39 functions to prevent powder 41 from entering annular acceleration cavity 35 and hollow cardboard cylinder 33 functions to form powder cavity 37 and retain the powder at a uniform thickness p surrounding the outer surface of aluminum cylinder 31. The required thickness p is determined by several parameters such as the explosive energy of powder 41, the type of aluminum from which cylinder 31 is made and the thickness, diameters and length of aluminum cylinder 31. What is essential is that these parameters are selected so that the inwardly directed explosive force of the powder 41 is sufficient to deform and accelerate inwardly the aluminum of cylinder 31 into contact with the surface of solid steel cylinder 29 with sufficient energy to deposit on and bond the aluminum to the exterior surface of solid steel cylinder 29.

The acceleration cavity 35 has a gap "a" that is sufficiently large to allow the aluminum to accelerate sufficiently to properly deposit on and bond to the steel cylinder. Steel cylinder 29 must have sufficient radial strength to prevent its collapse or deformation under the very large forces caused by the impact of the accelerating aluminum. It is preferable that steel cylinder 29 be solid; however, it may have a cavity provided it has sufficient thickness so that it does not deform. An alternative is to provide the desired cavity or bore and insert a mandrel into the bore to prevent deformation during the explosion process and then remove the mandrel. It is to be understood that there are several different methods that could be used to prevent cylinder deformation and they are to be considered within the scope of the present invention.

The depth "d" of the powder is not critical but it must be sufficient to provide a uniform spread of ignition to the powder in cavity 37 upon the ignition of ignition cap 43. The length of the cylinders must be sufficient to provide proper bond and deposit of the aluminum onto the outer surface of solid cylinder 29.

Referring to FIG. 3, step 1, the ignition cap 43 is ignited which ignites exposive powder 41. The explosion of powder 41 in powder cavity 37 causes the aluminum of aluminum cylinder 31 to explosively accelerate across gap "a" of acceleration cavity 35 to deposit on and bond to the surface of solid cylinder 29. This results in the bonding of aluminum cylinder 31' on solid steel cylinder 29 as shown in step 2.

Step 3 of this method of manufacture is to bore an opening 45 in solid steel cylinder 29 to form hollow steel cylinder 29' to which outer hollow aluminum cylinder 31' has been explosively bonded.

Step 4 is the cutting of slices along line 47 from explosively bonded hollow steel and aluminum cylinders 29' and 31' to form explosively bonded aluminum and steel rings 17 and 19.

Step 5 is the conventional steel to steel welding of steel fixture 13 to steel ring 19 and the conventional aluminum to aluminum welding of aluminum ring 17 to aluminum deck 15 as also shown and described in FIGS. 1 and 2.

It is important to note that the temperature of the explosive bonded line 21 be maintained at a temperature of less than about 600° F. during the welding of steel to steel weld 23 and aluminum to aluminum weld 25. This is to prevent degradation of the explosive bond.

What is claimed is:

1. The method of connecting a first member made of a first material to a second member made of a second material comprising the steps of:
 (a) explosively bonding a third member made of said first material to a fourth member made of said second material;
 (b) welding said first member made of said first material to said third member made of said first material;
 (c) welding said second member of said second material to said fourth member made of said second material; and
 (d) configuring said third and said fourth member as uniform annuli, said third member interior to and concentric with said fourth member and the exterior surface of said third member explosively bonded along its entire length to the interior surface of said fourth member.

2. The method of claim 1 wherein:
 (a) said first material is steel; and said second material is aluminum.

3. The method of claim 1 wherein said cylinder, said annulus of said second material and said annulus of said explosive material are coaxially aligned.

* * * * *